Nov. 7, 1961 H. D. TRIMMER 3,008,094

VARIABLE PHASE OSCILLATOR

Filed Dec. 11, 1958 4 Sheets-Sheet 1

INVENTOR.
HOWARD D. TRIMMER

BY

John A. Duffy
AGENT

Nov. 7, 1961 H. D. TRIMMER 3,008,094

VARIABLE PHASE OSCILLATOR

Filed Dec. 11, 1958 4 Sheets-Sheet 2

INVENTOR.
HOWARD D. TRIMMER

BY

John A. Duffy
AGENT

INVENTOR.
HOWARD D. TRIMMER
BY
John A. Duffy
AGENT

Nov. 7, 1961

H. D. TRIMMER 3,008,094

VARIABLE PHASE OSCILLATOR

Filed Dec. 11, 1958

4 Sheets-Sheet 4

INVENTOR.
HOWARD D. TRIMMER

BY

John A. Duffy
AGENT

United States Patent Office 3,008,094

Patented Nov. 7, 1961

3,008,094
VARIABLE PHASE OSCILLATOR

Howard D. Trimmer, Santa Clara, Calif., assignor to North American Aviation, Inc.

Filed Dec. 11, 1958, Ser. No. 779,581
17 Claims. (Cl. 331—136)

This invention relates to a variable phase oscillator and more particularly to an all electronic circuit for producing alternating currents, variable in phase with constant frequency, and variable in phase and frequency with constant voltage output.

In electronic circuits for instrumentation and the like, such as polyphase oscillators, generation of signals of uniform and stable characteristics with varying phase or frequency has presented many problems. In particular, known variable phase oscillators which attempt to vary frequency while maintaining the phase angle constant are severely limited in frequency ranges. In addition, known phase shifters are severely limited by reason of the fact that the voltage varies with the phase angle shift. Further, in variable phase and frequency oscillators it has been difficult to maintain a voltage constant for changes in frequencies and phase. Known devices for obtaining variable phase variable frequency output with constant voltage output accomplish the end result by utilizing a combination electromechanical servo devices and electronic circuits which are inherently complicated and inaccurate.

The device of this invention provides an all electronic circuit which produces alternating currents of variable phase and variable frequency with constant voltage output. The phase angle of the circuit may be varied over a wide range independent of frequency and the frequency may be varied independent of the phase angle. Varying the phase angle and the frequency does not affect the constant output voltage. The variable phase oscillator of this invention generates alternating current at any desired frequency while maintaining the voltage output at a constant amplitude and the phase angle at any desired range from 0 to 360 degrees.

It is therefore an object of this invention to provide an improved variable phase oscillator.

It is another object of this invention to provide a variable phase oscillator independent of frequency.

It is a further object of this invention to provide a variable phase oscillator whose frequency is independent of the change in phase angle.

It is a still further object of this invention to provide a variable frequency variable phase oscillator with constant voltage output.

It is another object of this invention to provide a variable phase variable frequency constant voltage oscillator.

It is still another object of this invention to provide a variable phase oscillator with a constant voltage output.

Other objects of the invention will become apparent from the following description taken in connection with the accompanying drawings in which.

Figure 2:
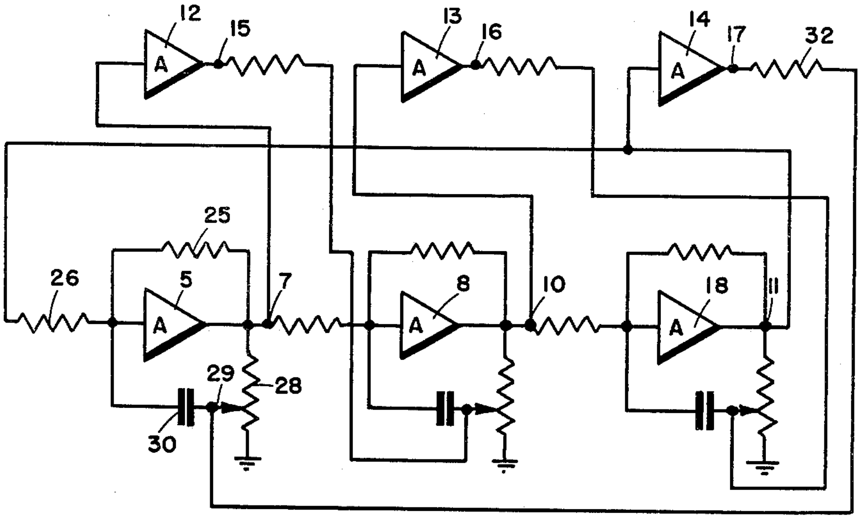
FIG. 2 is a schematic diagram illustrating the circuit of the invention which produces the variable frequency constant phase shift operation of the invention.
Figure 4A:
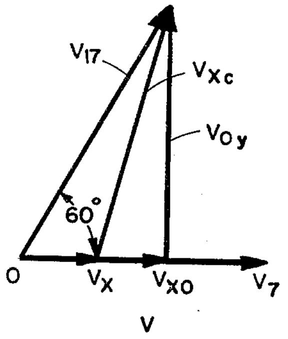
Figure 4B:
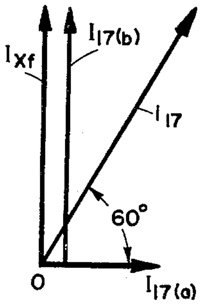
Figure 5:
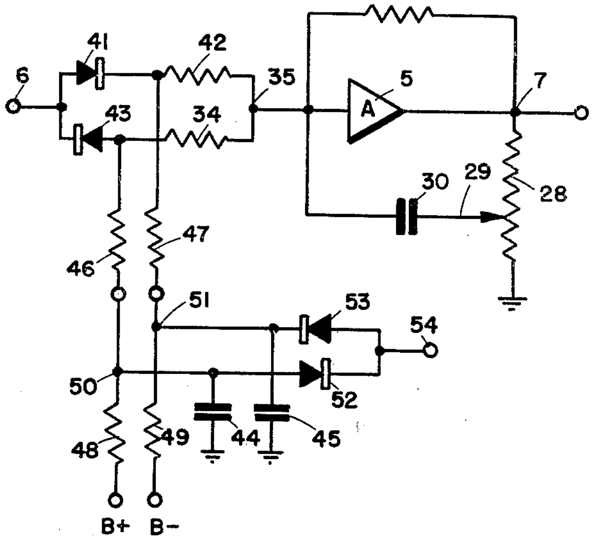
Figure 6:
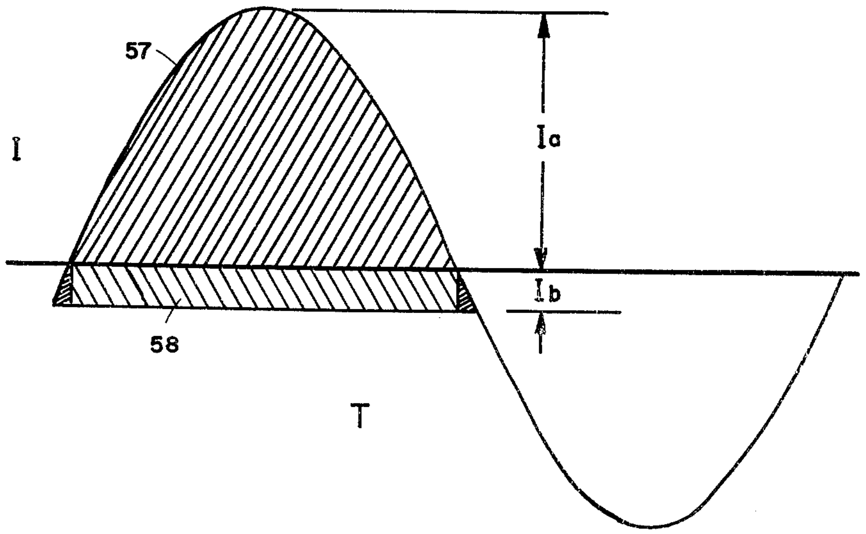
Figure 7:
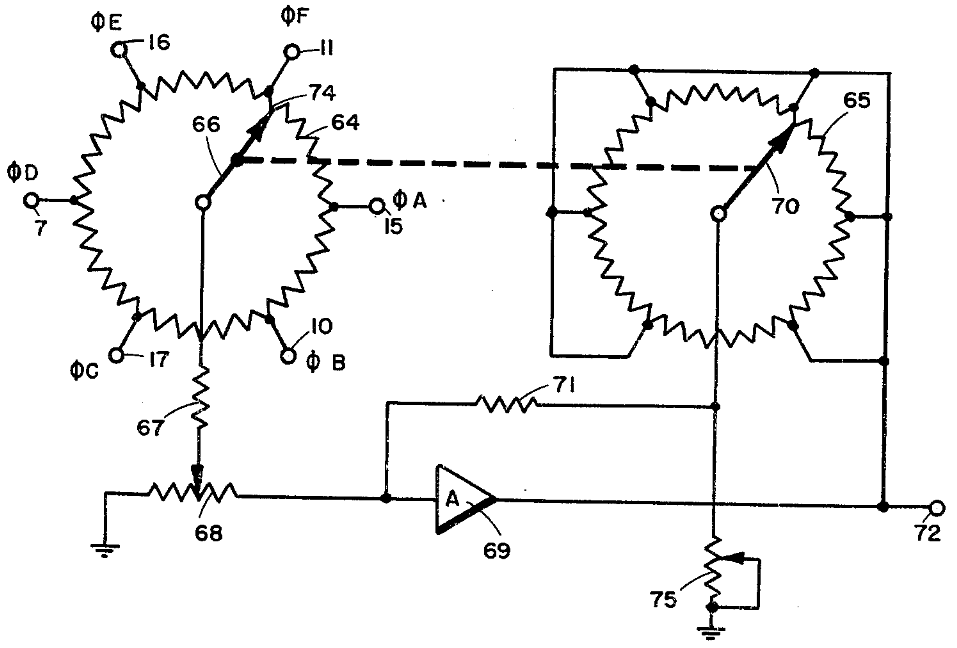

FIGS. 4*a* and 4*b* are vector diagrams illustrating the phase relationship between the voltages and currents during the operation of the frequency control means of FIG. 2;

FIG. 5 is a schematic diagram of one of the oscillators of FIG. 2 illustrating the voltage regulation of the invention;

FIG. 6 is a waveform illustrating the operation of the voltage regulation circuit of FIG. 5; and FIG. 7 is a schematic diagram illustrating the means for obtaining a phase leg at a predetermined angle from a reference phase.

Figure 1:
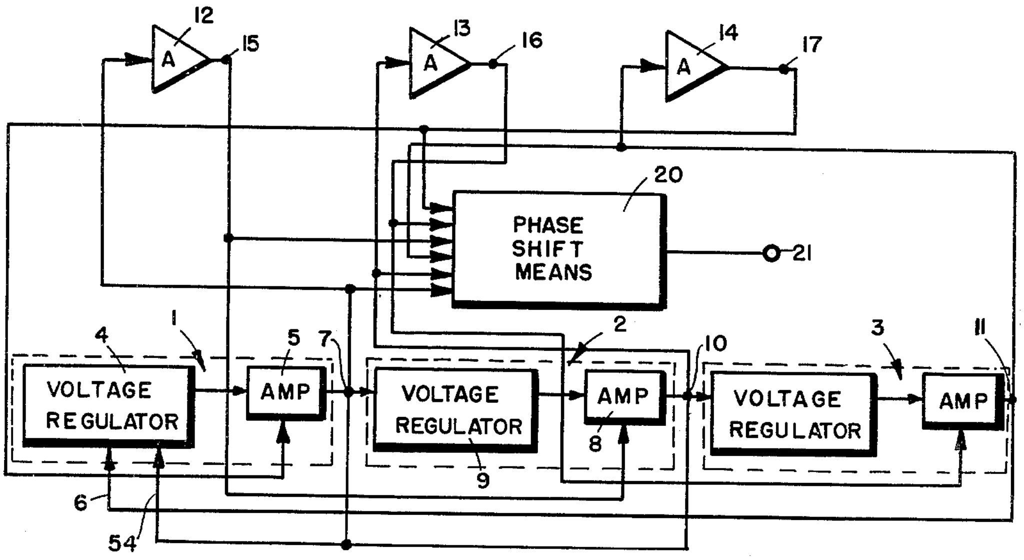
FIG. 1 is a block diagram illustrating the principles of the variable phase oscillator of this invention.

In accordance with the present invention as illustrated diagrammatically in FIG. 1 there is provided a variable phase oscillator which includes oscillator networks 1, 2, and 3 connected in closed loop tandem to provide a three-phase oscillator network having total gain of unity at 360 degrees. The closed loop circuit of networks 1, 2, and 3 oscillates and produces voltage outputs 120 degrees out of phase from each other at output terminals 7, 10, and 11. Each oscillator network comprises a circuit which receives a voltage of one phase at its input and amplifies the signal with a gain of unity at 120 degrees to produce a 120 degree phase at its output. For example, oscillator network 1 comprises amplifier 5 connected to receive a signal from terminal 6 through voltage regulator 4. Amplifier 5 amplifies the signal received from terminal 6 and produces an output signal at terminal 7 which is 120 degrees out of phase with the signal at terminal 6 because amplifier 5 is further designed to have a gain of unity at 120 degrees. The output signal at terminal 7 serves as the input to amplifier 8 through voltage regulator 9 of network 2. Terminal 10 presents an output signal which is 120 degrees out of phase with the signal at terminal 7 and which forms the input signal to network 3. Terminal 11 presents the output signal from network 3 which is 120 degrees out of phase with the signal at terminal 10. The signal from terminal 11 becomes the input signal at terminal 6, thus closing the loop. Thus, output signals at terminals 7, 10, and 11 combine to provide a three-phase alternating current signal whose phase legs are 120 degrees. Each of the phase legs produced at terminals 7, 10, and 11 is fed into one of three inverters which may be phase reversible amplifiers 12, 13, and 14 which produce signals 180 degrees out of phase with the corresponding input signal at terminals 15, 16, and 17, thereby providing a six-phase electrical signal. The six-phase signal produced at terminals 7, 10, 11, 15, 16, and 17 is fed into phase shift means 20. Phase shift 20 combines the six-phase legs, each 60 degrees apart, and provides an output phase leg at terminal 21 which is of any predetermined phase relationship from 0 to 360 degrees with a reference phase leg.

Turning now to FIG. 2, there is shown in more detail the schematic diagram of the oscillator circuit and the phase reversing circuit which provides a six-phase oscillator signal. In FIG. 2 operational amplifiers 5, 8, and 18 are connected in closed tandem loop to provide a three-phase oscillator. Each of amplifiers 5, 8, and 18 receives a voltage at its input of one phase and amplifies that signal with a gain of unity at 120 degrees to provide another phase leading to the input phase by 120 degrees. A self-sustaining three-phase oscillator is formed by the closed loop tandem connection whereby the output phase angle produced by one amplifier is used as the input signal to a subsequent amplifier. Amplifier 5 has an appropriate input resistor 26. Feedback resistance 25 connected between the output and input circuits of amplifier 5 controls the gain. Resistor 25 is selected so that the ratio of impedance of resistor 25 to the impedance of resistor 26 is such that the gain is unity at 120 degrees thereby insuring 120 degrees phase shift between the input and output circuits of the amplifier. A practical ratio between resistances 25 and 26 has been found, for example, to be the ratio of 2 to 1. A resistance-capacitance circuit connected between the output and input of amplifier 5 provides frequency control of the oscillation of the amplifier. Resistor 28 connected in series with capacitor 30 between the output and input of amplifier 5 provides the series circuit. Frequency variations is provided by varying position of wiper 29 on resistor 28. Capacitor 30 completes the reactive feedback circuit for controlling the frequency. The value of capacitor 30 is selected so as to conform to the desired frequency range. In addition, the capacitor 30 should be selected so that the ratio of $X_C$ to $R_{26}$ is approximately 2 divided by the square root of 3.

In order to utilize the oscillator circuit in a high frequency range means are provided for compensating for the inherent error in feedback current through resistor 28. The reactive feedback current through resistor 28 produces a corresponding reactive voltage drop which provides for a lagging voltage at wiper 29. This lagging voltage produces a component of current through capacitor 30 in phase with the feedback current in gain controlling resistor 25 thereby tending to lower the gain of amplifier 5 below unit. This results in a drop in the output voltage of amplifier 5 at higher frequencies if not compensated for. The compensating means comprise a circuit connected to be responsive to the signal from terminal 17 whose voltage leads by 60 degrees the voltage at terminal 7. A reactive current is provided by supplying current from the leading phase at terminal 17 through resistor 32 to a point in common with one plate of capacitor 30 and wiper 29. This results in a quadrature current which compensates for the capacitive loading by capacitor 30 of the resistance circuit of resistor 28. Since the reactive current at the oscillator frequency is always constant, then a quadrature current is supplied to wiper 29 through resistor 32. This reactive current effectively compensates for the error produced by the reactive voltage. Thus, in amplifier 5 frequency control of the oscillator circuit provided by resistor 28 and capacitor 30 connected in series between the output and input of amplifier 5 is obtained and errors in the circuit are compensated for by supplying a quadrature current from a 60 degree leading phase through resistor 32. This compensating circuit allows for greater frequency range available to the oscillator circuit.

Amplifiers 8 and 18 are connected as amplifier 5 with resistor capacitor feedback circuits preferably equal in value to the value selected for the circuit of amplifier 5. Each feedback capacitor of amplifiers 8 and 18 is provided with a reactive current through a fixed resistor which compensates for the reactive error produced by the capacitor across the resistance circuit in the feedback loop. Amplifiers 12, 13, and 14 are respectively connected to be responsive to signals from terminals 7, 10, and 11, produce signals whose phase angles are 180 degrees out of phase with their respective input signals. Thus amplifier 12 produces a signal with a phase which is 180 degrees out of phase with the phase angle at terminal 7. Amplifier 13 produces a phase angle 180 degrees out of phase with the phase angle at terminal 10, and amplifier 14 produces a signal with a phase angle 180 degrees out of phase with the signal at terminal 11. Amplifiers 12, 13, and 14 produce at their output three signals whose phase angle is such that in combination with the outputs of amplifiers 5, 8, and 18 form a six-phase output signal, each phase being 60 degrees phase angle relationship with the other.

Figure 3:
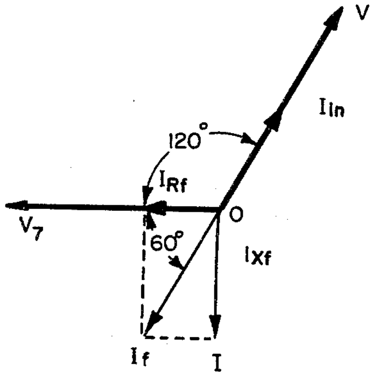
FIG. 3 is a vector diagram illustrating the phase relationship between the various signals of one of the oscillators of FIG. 2.

Turning now to FIG. 3, there is shown a vector diagram representing a signal provided by an oscillator circuit for one amplifier, for example amplifier 5. The vector $V_7$ represents the voltage at terminal 7 and is chosen as the reference signal. The vector $I_{RF}$ represents the current through resistor 25 which is in phase with the voltage $V_7$. The reactive feedback current through resistor 28 and capacitor 30 represented by vector $I_{XF}$ leads to the voltage $V_7$ by 90 degrees. The reactive feedback current $I_{XF}$ flows through the circuit of resistor 28 to the wiper 29, through capacitor 30, to the input of amplifier 5. The sum of the vectors of the currents produced by $I_{RF}$ and $I_{XF}$ is the total feedback current $I_F$ which leads $V_7$ by 60 degrees. If the sum of the currents into the null point 0 is zero, then the input current represented by vector $I_{in}$ is equal and opposite and lags $V_7$ by 120 degrees. It should be noted that the ratio of reactive feedback current $I_{XF}$ to resistive feedback current $I_{RF}$ must always be constant if the total feedback current $I_F$ is to lead the output voltage represented as the vector $V_7$ by 60 degrees. Since the resistance 25 is constant then the reactance of capacitor 30 will be a constant value at the oscillator frequency.

FIGS. 4*a* and 4*b* show vector diagrams illustrating the frequency control operation of the circuit of FIG. 2. In FIG. 4*a* there is shown a vector diagram of the voltages of the oscillator circuit of amplifier 5 and FIG. 4*b* shows a vector diagram of the various currents produced therein. In FIG. 4*a* the $V_7$ vector represents the output voltage of amplifier 5 at terminal 7 and is chosen as the reference. The $V_X$ vector is the voltage applied to capacitor 30 from the voltage division circuit provided by wiper 29 and resistor 28 and can vary in length over all of the $V_7$ vector. The voltage applied across the fixed feedback resistor 32 is shown by the vector $V_{XC}$ drawn from $V_X$ to meet $V_{17}$. The $V_{17}$ vector is the voltage at terminal 17 representing a signal whose phase angle leads the phase angle of the signal at terminal 7 by 60 degrees as shown. Vector $V_{XC}$ can be resolved into two components. One component $V_{X0}$ lies along the vector $V_7$ and varies in length when the vector $V_X$ varies. The other component $V_{0Y}$ is in quadrature with the vector $V_7$ and is always equal to the square root of 3 over 2 times the oscillator voltage $V_{17}$ in magnitude.

The current through resistor 32 can be resolved into two components also as shown in FIG. 4*b*. The component of current in phase with the fixed component of voltage across resistor 32 is equal to the current through capacitor 30 and is shown as $I_{XF}$. Resistor 32 furnishes the quadrature current required by capacitor 30 to compensate for the error provided by the reactive voltage existing across resistor 28. Therefore, the only current flowing in the circuit of resistor 28 is along the $V_7$ vector. This is represented in FIG. 4*b* as $I_{17(a)}$. Likewise, the vector representing 17(*b*) represents the component of current provided by terminal 17 which is in phase with $I_{XF}$. The component of current through resistor 32 that lies along the vector $V_7$ develops a negligible voltage in the circuit of resistor 32 since the resistance of resistor 32 is small compared to the input resistance of resistor 26. Thus the current $I_{17(b)}$ furnishes the quadrature current required by capacitor 30 of FIG. 2. The only current flowing in resistor 28 lies along the $I_{17(a)}$ vector. The component of current through resistor 32 that lies along the $I_{17(a)}$ vector develops a negligible voltage across resistor 28 since the impedance of resistor 28 is small compared with the impedance of resistance 32. Thus since the feedback circuit of resistor 28 is not supplying the reactive feedback current errors in output voltage are reduced to a minimum. Thus as can be seen by the vector diagram circuits of FIGS. 4*a* and 4*b* taken in conjunction with the schematic diagram of FIG. 2 that the highly accurate frequency control is maintained by compensating for the error in voltage produced by the feedback capacitor in the amplifier circuits.

Turning now to FIG. 5 there is shown a schematic diagram of a voltage regulator circuit associated with each of the amplifiers of the circuit of FIG. 2. Amplifier 5 only is shown for simplification purposes. The voltage regulator shown in FIG. 5 works equally well on each of amplifiers 5, 8, and 18, each of which have a voltage regulator identical with that shown in FIG. 5 for amplifier 5. The input resistor 26 for amplifier 5 is separated into two paths with a diode in each path. Diode 41 and resistor 42 comprise one path which conducts during the positive half cycle and diode 43 and resistor 34 comprise the other half which will conduct during the entire negative half cycle. Thus both half cycles are summed equally at the null point 35 which is the input to amplifier 5. At the same time diodes 41 and 43 rectify current which is fed into capacitors 44 and 45 through resistors 46 and 47 respectively. The voltage charge level on capacitors 44 and 45 determines the bias voltage of the regulator circuit which in turn sets the voltage level at which diodes 41 and 43 conduct. Direct current reference potentials are provided by a connection from the B+ terminal of a D.-C. source through resistor 48 to resistor 46 at point 50 and a connection of the B− terminal through resistor 49 to resistor 47 at point 51. Capacitors 44 and 45 each have one plate grounded and the other plate connected in common with the B+ and B− and resistors 46 and 47 respectively. Capacitors 44 and 45 are also connected to receive the output currents from the other two phases converted into direct current by diodes 52 and 53. Thus terminal 54 is connected by means (not shown) which are responsive to output terminals 10 and 7 which are shown in FIGS. 1 and 2. The reference potential supplied through resistors 48 and 49 from the source of D.-C. potential is compared at points 50 and 51 with the current from the other two phases of the output signal of the oscillator supplied through diodes 52 and 53. When the output current of the oscillator is less than the reference current then point 50 becomes positive and point 51 becomes negative. Another way of stating the above is that the charge on capacitor 44 is less than the reference voltage and the charge on capacitor 45 is greater than the reference voltage when the output voltage of the oscillator is less than the reference voltage. When point 50 is positive and point 51 negative diode 41 will conduct during the entire positive half cycle and for part of the negative half cycle (point 51 being negative). Likewise, diode 43 will conduct during the entire negative half cycle and for part of the positive half cycle (point 50 being positive). The resultant current supplied to the input of amplifier 5, with the positive and negative half cycles being summed at point 35, increases causing the output voltage of amplifier 5 at terminal 7 to increase. On the other hand, a decrease in output voltage of the oscillator as provided at point 54 causes point 50 to go negative and point 51 to go positive, thereby decreasing the current supplied to point 35 at the input of amplifier 5 which reduces the voltage at output terminal 7. The voltage regulation continues until the charge on capacitors 44 and 45 is equal to the reference voltage supplied to points 50 and 51. Amplifiers 8 and 18 have similar regulation circuitry with resistors 48 and 49 and capacitors 44 and 45 common to all the circuits.

In FIG. 6 there is shown a waveform illustrating the operation of the regulator circuit of FIG. 5. The sine wave 57 illustrated in FIG. 6 represents the current at point 35 in FIG. 5. Resultant current entering null point 35 from the input circuit is a complete sine wave plus a portion 58 of a sine wave which approaches a trapezoidal shape when the charge on capacitor 44 is less than the reference potential and the charge on capacitor 45 is greater than the reference potential indicating that the output voltages of the oscillator are below the reference level. The net result of the summation of the two components of input current causes the output voltage of amplifier 5 to increase. The total input current is sine wave 57 plus trapezoidal 58. Thus the current $I_a$ is the current at point 35 for one-half of the sine wave averaged over a complete cycle. The current $I_b$ is the current that flows as a result of point 50 being positive and point 51 being negative. The wave form in FIG. 6 illustrates only the condition where the voltage regulator is operating to supply more input current to compensate for a low output voltage. When the output voltage is greater than the reference voltage, the total input current is a sine wave such as 57 with a trapezoid portion thereof taken out of the middle thereby reducing the current supplied to point 35 and thereby reducing the output voltage.

If the closed loop gain of the three-phase oscillator of FIG. 2 were exactly unity at 360 degrees, then the voltage regulation of amplifier 5, for example, would introduce a trapezoidal wave into the input of each amplifier, such as amplifier 5, long enough to establish the correct oscillator voltage. Thereafter the trapezoidal wave will completely disappear. However, if the closed loop gain is not unity at 360 degrees then the regulator must continually supply a trapezoidal wave whose fundamental component will maintain a constant oscillator voltage. The error in the closed loop gain of the combination of the three amplifiers may occur in each of the three oscillators or in only one of the amplifier circuits, for example amplifier 5. However, for a small error in a closed loop gain it may safely be assumed that the error is equal in all three circuits without introducing appreciable error in the voltage regulator.

Referring now to FIG. 7 there is shown the phase shift circuit 20 of FIG. 1. This circuit makes it possible to select any phase angle between 0 and 360 degrees by rotating closed loop potentiometers 64 and 65 to a predetermined position. Closed loop potentiometer 64 receives all six phases of the output of the circuit shown in FIG. 1 and FIG. 2 with the six phases being fed so that the intermediate resistances on potentiometer 65 therebetween are equal. Thus phase angles A, B, C, D, E, and F, representing the signals from terminals 15, 10, 17, 7, 16, and 11, are fed into closed loop potentiometer 64. Wiper 66 of potentiometer 64 is connected at one end through resistor 67 and gain control resistor 68 to ground. Resistor 68 is also connected to the input of variable amplitude amplifier 69. Feedback resistor 71 is connected between wiper 70 of potentiometer 65 and the input of amplifier 69. Wiper 70 of potentiometer 65 is ganged with wiper 66 so that as the voltage of the wiper arm 66 drops in magnitude the feedback resistance of resistor 71 rises to increase the gain of the amplifier circuit. The total resistance of potentiometers 64 and 65 is equal, and the output of amplifier 69 at terminal 72 produces a signal whose phase angle depends upon the location of wiper arms 66 and 70 on the circle of potentiometers 64 and 65. As wipers 66 and 70 are rotated, the wiper arm voltage moves through 360 degrees from a reference point. When the wiper arms are at midpoint between two adjacent planes, for example point 74 midway between phase legs A and F, the voltage at output terminal 72 is 30 degrees out of phase with reference phase leg A. The voltage at wiper arm 66 falls to the cos 30 degrees times the voltage at either phase F or phase A. This drop of voltage is directly compensated for by the feedback circuit through resistor 71. The variable voltage divider made up of potentiometer 65 and trimming resistance 75 causes the feedback voltage applied to feedback resistance 71 to vary. Thus as the input voltage at wiper 66 drops in magnitude, the feedback voltage applied to resistance 71 also drops in magnitude by the same proportion, causing the amplifier to maintain a constant output voltage. The variable voltage divider causes the effective feedback impedance to increase as the wiper arm of potentiometer 65 is moved from a potentiometer tap to the midpoint between taps. Thus the ratio of feedback resistance (of 71) to input resistance (of resistors 67 and 68) increases, increasing the gain of amplifier 69 thereby maintaining a constant voltage output at terminal 72.

The variable phase amplifier of FIG. 7 can be made to produce a frequency which differs from the oscillator frequency by driving potentiometer wiper arms 66 and 70 at the difference frequency. The difference frequency must be kept very low, however, in order to protect the long life of the potentiometer. The resistance 75 connected to wiper arm 70 is a small trimming resistor that may be adjusted to make the magnitude of the output voltage between the phases equal to the output voltage on either phase.

Although this invention has been described and illustrated in detail, it is to be clearly understood that the same is by way of illustration and example only and is not to be taken by way of limitation, the spirit and scope of this invention being limited only by the terms of the appended claims.

I claim:

1. A variable phase oscillator comprising a plurality of amplifiers connected in closed loop tandem to provide a multiphase oscillator network, a plurality of inverters responsive to the output of said plurality of amplifiers to provide signals 180 degrees out of phase with the signals produced by said plurality of amplifiers, each of said amplifiers having feedback means connected between the output and input thereof to control the frequency of said oscillator, each said feedback means being responsive to the output of that inverter producing a signal 60 degrees out of phase with the signal produced by the amplifier associated with each said feedback means.

2. The combination recited in claim 1 wherein is included in each of said amplifiers an input impedance circuit, each said input impedance circuit comprising a pair of current paths, each said current path having a unidirectional diode and resistor in series for flow of current in one direction and a unidirectional diode and resistor in series for the flow of current in the opposite direction, the common points between said diodes and said resistors connected to receive rectified current from the output of the other said amplifiers, and capacitor means connected to be responsive to said rectified current for establishing a bias voltage.

3. The combination recited in claim 1 wherein is included phase shift means responsive to the output of said amplifiers and said inverters for producing a signal whose phase angle is at a predetermined relationship with one of said input signals to said phase shift means.

4. A polyphase oscillator comprising a plurality of amplifiers connected in closed loop tandem to provide a three-phase oscillator network, a plurality of inverters responsive to the output of said plurality of amplifiers to provide signals 180 degrees out of phase with the signals produced by said plurality of amplifiers whereby a six-phase oscillator network is provided, means for varying the frequency of said six-phase oscillator network, said means comprising a resistor and capacitor series circuit connected between the output and input of each of said plurality of amplifiers, and means for varying the impedance of each of said resistors.

5. The combination recited in claim 4 wherein each said amplifier has included therein frequency control means, said means comprising a resistor having one end connected to be responsive to the output of that inverter producing a signal which leads in phase by 60 degrees the output signal produced by said amplifier.

6. The combination recited in claim 5 wherein is included in each of said amplifiers voltage regulation means comprising an input impedance circuit, said input impedance circuit comprising a pair of current paths, one of said current paths operable during the positive half cycle of current flow, the other said current path operable during the negative half cycle of current flow, a source of reference potential, means for deriving a potential proportional to the output potential of said oscillators, means for comparing said reference potential and said output potential, said current paths responsive to the output of said comparison means.

7. A polyphase oscillator comprising a plurality of amplifiers connected in closed loop tandem to provide a three-phase oscillator network, a plurality of inverters responsive to said plurality of amplifiers to provide signals 180 degrees out of phase with the signals produced by said plurality of amplifiers whereby a six-phase oscillator network is provided, a first closed loop potentiometer, means for connecting the signals produced by said amplifiers and said inverters to a point on said first potentiometer, the resistance between adjacent points on said first potentiometer being substantially equal, a second closed loop potentiometer having points corresponding to the points on said first potentiometer whereby the resistance between adjacent points on said second potentiometer are substantially equal to the resistance between corresponding adjacent points on said first potentiometer, said points on said second potentiometer connected to a common point, each of said potentiometers having a wiper arm selectively positionable at any point on said potentiometers to detect a voltage having a phase relative to the voltage of one of said signals produced by said oscillators and said amplifiers, said wiper arms ganged to provide the same relative movement, amplifier means responsive to the wiper arm of said first potentiometer, the output of said amplifier means connected to said common point, and feedback means responsive to the wiper arm of said second potentiometer for varying the gain of said amplifier means in accordance with the voltage on said wiper arms.

8. Phase shift means comprising a first closed loop potentiometer having a plurality of points corresponding to phase legs, the resistance between adjacent points on said potentiometer being substantially equal, a first wiper arm selectively positionable at any point on said potentiometer to detect a voltage having a phase relative to the voltage of one of said phase legs selectively variable, amplifier means having an input responsive to said first wiper arm and an output connected to present said phase shifted voltage, and resistance means responsive to the voltage on said wiper arm for controlling the gain of said amplifier means.

9. The combination recited in claim 8 wherein said resistance means comprises a second closed loop potentiometer having a plurality of points corresponding in number and relative position to the points on said first wiper arm, said second potentiometer having a second wiper arm connected to said first wiper arm for corresponding relative movement therewith, the points on said second potentiometer being connected in common to the output of said amplifier and means for connecting said second wiper arm to the input of said amplifier means.

10. A variable phase oscillator comprising a plurality of amplifiers connected in closed loop tandem to provide a three-phase oscillator network, a plurality of inverters responsive to the output of said plurality of amplifiers to provide signals 180 degrees out of phase with the signals produced by said plurality of amplifiers whereby a six-phase signal is produced, each of said amplifiers having feedback means connected between the output and the input thereof to control the frequency of said oscillators, each said feedback means being responsive to a signal from the output of said inverter producing a signal 60 degrees out of phase with the signal provided by its associated amplifier, each of said amplifiers having voltage regulation means, each said voltage regulation means comprising an input impedance circuit, said input impedance circuit comprising a pair of current paths, one of said current paths operable during the positive half cycle of current flow, the other said current path during the negative half cycle of current flow, a source of reference potential, means for deriving a potential proportional to the output potential of said amplifiers, means for comparing said reference potential and said output potential, said current paths responsive to the output of said comparison means, and phase shift means responsive to the output of said amplifiers and said inverters for producing a signal whose phase angle is at a predetermined relationship with one of said input signals to said phase shift means.

11. The combination recited in claim 10 wherein said phase shift means comprises a first closed loop potentiometer, means for connecting the signals produced by said amplifiers and said inverters to a point on said first potentiometer, the resistance between adjacent points on said first potentiometer being substantially equal, a second closed loop potentiometer having points corresponding to the points on said first potentiometer whereby the resistance between adjacent points on said second potentiometer is substantially equal to the resistance between corresponding adjacent points on said first potentiometer, said points on said second potentiometer connected to a common point, each of said potentiometers having a wiper arm selectively positionable at any point on said potentiometers to detect voltage having a phase relative to the voltage of one of said signals produced by said amplifiers and said inverters, said wiper arms ganged to provide the same relative movement, amplifier means responsive to the wiper arm of said first potentiometer, the output of said amplifier means connected to said common point, and feedback means responsive to the wiper arm of said second potentiometer for varying the gain of said amplifier means in accordance with the voltage on said wiper arms.

12. A polyphase oscillator comprising a plurality of amplifiers connected in closed loop tandem to provide a three-phase oscillator network, a plurality of inverters responsive to the output of said plurality of amplifiers to provide signals 180 degrees out of phase with the signals produced by said plurality of amplifiers whereby a six-phase oscillator network is provided, means for varying the frequency of said six-phase oscillator network, said means comprising a resistor and capacitor series circuit connected between the output and input of each of said plurality of amplifiers, means for varying the impedance of each of said resistors, and phase shift means responsive to the output of said amplifiers and said inverters for producing a signal whose phase angle is at a predetermined relationship with one of said input signals to said phase shift means.

13. A variable phase oscillator comprising a plurality of amplifiers connected in closed loop tandem to provide a three-phase oscillator network, a plurality of inverters responsive to the output of said plurality of amplifiers to provide signals 180 degrees out of phase with the signals produced by said plurality of amplifiers whereby a six-phase signal is produced, each of said amplifiers having feedback means connected between the output and input thereof to control the frequency of said oscillator, frequency control means for each said amplifier comprising a resistor circuit being connected to be responsive to the output of said inverter producing a signal 60 degrees out of phase with the signal produced by said amplifier, each said feedback means being responsive to the output of said resistor circuit whereby the frequency of said amplifiers is maintained at a predetermined constant level, each of said amplifiers having a voltage regulation means, each said voltage regulation means comprising an input impedance circuit for each of said oscillators, said input impedance circuit comprising a pair of current paths operable during the positive and negative half cycles of current flow respectively, a source of reference potential, means for deriving a potential proportional to the output potential of said amplifiers, means for comparing said reference potential and said output potential, said current paths responsive to the output of said comparison means, and phase shift means responsive to the output of said amplifiers and said inverters for producing a signal whose phase angle is at a predetermined relationship with one of said input signals to said phase shift means, said phase shift means comprising a pair of closed loop potentiometers having wiper arms thereon ganged to provide the same relative movement, said wiper arms selectively positionable at any point on said potentiometers to detect a voltage having a phase relative to the voltage in one of said signals produced by said amplifiers and said inverters, amplifier means responsive to the wiper arms of said potentiometers and feedback means responsive to the wiper arm of said second potentiometer for varying the gain of said amplifier means in accordance with the voltage on said wiper arms.

14. A variable phase oscillator comprising a plurality of amplifiers connected in closed loop tandem to provide a three-phase oscillator network, a plurality of inverters responsive to the output of said plurality of amplifiers to provide signals 180 degrees out of phase with the signals produced by said plurality of amplifiers whereby a six-phase signal is produced, feedback means connected between the output and input of each said amplifier to control the frequency of said oscillator, each of said feedback means being responsive to the output of said inverter amplifier producing a signal 60 degrees out of phase with the signal produced by said amplifier.

15. A variable phase oscillator comprising a plurality of amplifiers connected in closed loop tandem to provide a three-phase oscillator network, a plurality of inverters responsive to the output of said plurality of amplifiers to provide signals 180 degrees out of phase with the signals produced by said plurality of amplifiers whereby a six-phase signal is produced, each of said amplifiers having feedback means connected between the output and input thereof to control the frequency of said oscillator, each of said feedback means being responsive to the output of said inverter producing a signal 60 degrees out of phase with the signal of said amplifier, and phase shift means responsive to the output of said amplifiers and said inverters for producing a signal whose phase angle is at a predetermined relationship with one of said input signals to said phase shift means.

16. A variable phase oscillator comprising a plurality of amplifiers connected in closed loop tandem to provide a three-phase oscillator network, means for regulating the voltage in each said amplifier, said voltage regulation means comprising an input impedance circuit, said input impedance circuit comprising a pair of current paths, one of said current paths operable during the positive half cycle of current flow, the other said current path operable during the negative half cycle of current flow, a source of reference potentials, means for deriving a potential proportional to the output potential of said amplifiers, means for comparing said reference potential and said output potential, said current paths responsive to the output of said comparison means.

17. A variable phase oscillator comprising a plurality of amplifiers connected in closed loop tandem to provide a three-phase oscillator network, a plurality of inverters responsive to the output of said plurality of amplifiers to provide signals 180 degrees out of phase with the signals produced by said plurality of amplifiers whereby a six-phase signal is produced, each of said amplifiers having feedback means connected between the output and the input thereof, said feedback means including a resistor and capacitor series circuit connected between the output and input of each of said plurality of amplifiers, means for varying the impedance of each of said resistors to adjust the frequency of said amplifiers, each of said feedback means being responsive to the output of said phase reversible amplifier producing a signal 60 degrees out of phase with the signal of said amplifier whereby the frequency of said oscillator is controlled.

References Cited in the file of this patent

UNITED STATES PATENTS

| | | |
|---|---|---|
| 2,245,598 | Llewellyn | June 17, 1941 |
| 2,511,197 | Darlington | June 13, 1950 |
| 2,652,458 | Miller | Sept. 15, 1953 |
| 2,791,694 | Groenendyke | May 7, 1957 |

FOREIGN PATENTS

| | | |
|---|---|---|
| 781,374 | Great Britain | Aug. 21, 1957 |